United States Patent [19]

Oda

[11] Patent Number: 4,783,298

[45] Date of Patent: Nov. 8, 1988

[54] IN-MOLD COATING METHOD AND APPARATUS

[75] Inventor: Masamitsu Oda, Hiroshima, Japan

[73] Assignee: Mazda Motor Corporation, Hiroshima, Japan

[21] Appl. No.: 947,874

[22] Filed: Dec. 30, 1986

[30] Foreign Application Priority Data

Jan. 8, 1986 [JP] Japan ................................. 61-2477

[51] Int. Cl.$^4$ .................... B29C 41/20; B29C 41/22; B29C 45/14; B29C 45/16

[52] U.S. Cl. .................................. 264/155; 264/254; 264/255; 264/257; 425/290; 425/553; 425/566; 118/37

[58] Field of Search ............... 264/154, 155, 156, 255, 264/257, 241, 275, 277, 278, 279, 246, 247, 254; 118/35, 37; 425/90, 96, 97, 98, 290, 310, 553, 566, 571, DIG. 37

[56] References Cited

U.S. PATENT DOCUMENTS

| | | | |
|---|---|---|---|
| 2,527,628 | 10/1950 | Francis | 264/122 |
| 2,698,460 | 1/1955 | Amo | 425/290 |
| 3,165,787 | 1/1965 | Carmack | 264/156 |
| 3,175,249 | 3/1965 | Ferreira | 264/261 |
| 3,231,938 | 2/1966 | Seymour | 425/563 |
| 3,433,860 | 3/1969 | Ruggles et al. | 264/156 |
| 3,522,340 | 7/1970 | Corcoran et al. | 264/244 |
| 3,627,608 | 12/1971 | Steiner | 264/156 |
| 3,797,984 | 3/1974 | Yago et al. | 425/549 |
| 4,043,726 | 8/1977 | Tsunemoto | 425/563 |
| 4,076,788 | 2/1978 | Ditto | 264/255 |
| 4,092,385 | 5/1978 | Balevski et al. | 264/328.7 |
| 4,106,887 | 8/1978 | Yasuike et al. | 425/4 R |
| 4,129,636 | 12/1978 | Boden | 264/328.6 |
| 4,133,101 | 1/1979 | Glover | 264/156 |
| 4,133,858 | 1/1979 | Hayakawa et al. | 264/328.7 |
| 4,153,231 | 5/1979 | Hayakawa et al. | 425/546 |
| 4,235,833 | 11/1980 | Arnason et al. | 264/255 |
| 4,240,995 | 12/1980 | Milne | 264/156 |
| 4,245,976 | 1/1981 | Arnason | 264/255 |
| 4,247,515 | 1/1981 | Olabisi | 264/500 |
| 4,261,285 | 4/1981 | Pearl | 118/37 |
| 4,329,134 | 5/1982 | Arnason et al. | 425/157 |
| 4,370,123 | 1/1983 | Dannels et al. | 425/543 |
| 4,409,163 | 10/1983 | Van Manen | 264/156 |
| 4,495,740 | 1/1985 | Sarrazin | 264/255 |
| 4,568,597 | 2/1986 | Williams | 264/156 |
| 4,647,274 | 3/1987 | Oda | 425/135 |
| 4,670,199 | 6/1987 | Montet | 264/255 |
| 4,705,473 | 11/1987 | Schmidt | 425/563 |

*Primary Examiner*—James Lowe
*Assistant Examiner*—Jeremiah F. Durkin, II
*Attorney, Agent, or Firm*—Burns, Doane, Swecker & Mathis

[57] ABSTRACT

A method and an apparatus for forming a coating layer on a molded product formed in a split-type mold assembly, which assembly includes first and second dies supported for movement relative to each other and a shut-off pin for forming a perforation in the molded product. The shut-off pin is first caused to project into a mold cavity, defined between the first and second dies when the both are closed together, through the first dies during the formation of the molded product. The shut-off pin is then allowed to retract from the mold cavity and inwardly of the first dies, leaving in the molded product the perforation extending completely through the thickness of the molded product. The second die is subsequently separated from the molded product while still maintaining the mold assembly in a sealed condition to form a coating space between the molded product and the second die, and a fluidized coating material is injected from an injector positioned on one side of the first die remote from the second die, into the coating space through the perforation in the molded product. When the first and second dies are brought together to spread the coating material over the molded product, the coating layer is formed on the molded product facing the second die.

7 Claims, 7 Drawing Sheets

IN-MOLD COATING METHOD AND APPARATUS

CROSS-REFERENCE TO THE RELATED APPLICATIONS

U.S. patent application Ser. No. 751,978, filed June 28, 1985, by M. Oda, is assigned to the assignee of the present application. This application was issued as U.S. Pat. No. 4,647,274 on Mar. 3, 1981.

BACKGROUND OF THE INVENTION

1. Field of Technology

The present invention relates to an in-mold coating method and apparatus for forming a molded product and subsequently forming a coating layer on one surface of the molded product both performed in one mold assembly.

2. Description of the Prior Art

The use of fiber-reinforced plastics in an automobile body structure is not a new development, and sheet molding compounds are examples of those plastics. The sheet molding compound is, as the nomenclature indicates, in the form of a sheet containing a fiber-reinforced thermosetting resin and a catalyst which serves as a cure-accelerating agent. When using this matter, one or more sheets of sheet molding compounds (SMC) are placed in a molding cavity defined between a pair of relatively movable dies forming the mold assembly and are then compressed together. Since the dies are heated to a temperature sufficient to fluidize the SMC sheets, the SMC sheets inside the molding cavity are fluidized in the molding cavity and then cured by the action of the catalyst contained therein to provide a molded article complemental in shape and size to the molding cavity.

Figure 11:
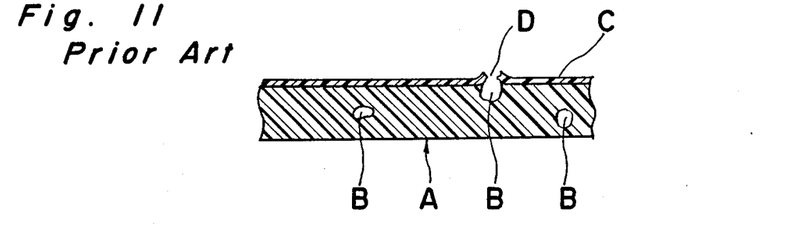
FIG. 11 is a partial sectional view of the molding made by the use of the prior art in-mold coating method.

Since the SMC sheet often contains air in its structure and/or since air tends to admix the SMC sheets when the latter are fluidized, it often occurs that the resultant molded article identified by A in FIG. 11 of the accompanying drawings contain cavities B as shown therein. Because of this, when a coating material or paint is applied on one surface of the molded article A and then baked to form a coating layer C, some of the cavities B in the molded article A adjacent the coating layer C blow up under the influence of heat used during the baking, resulting in the formation of pinholes or blow holes as indicated by D.

Once the pinholes or blow holes D are formed, surface imperfections are formed and, therefore the final product having such surface imperfections can no longer be used as a material for, for example, automobile door panels.

Figure 12:
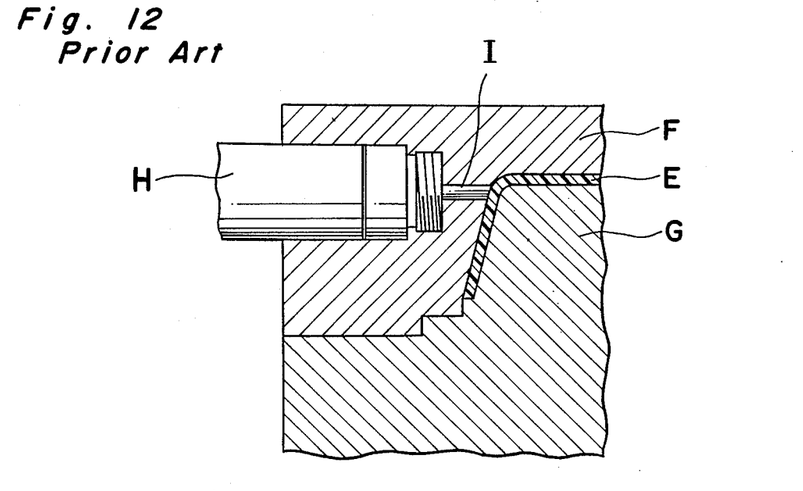
FIG. 12 is a partial longitudinal sectional view of the prior art in-mold coating apparatus.

An in-mold coating technique such as disclosed in U.S. Pat. Nos. 4,076,788, issued Feb. 28, 1978; 4,235,833, issued Nov. 25, 1980; 4,245,976, issued Jan. 20, 1981; and 4,329,134, issued May 11, 1982 is considered effective to obviate the above discussed problem. According to the in-mold coating technique, both the compression molding and the coating are carried out in succession in a single mold assembly. FIG. 12 of the accompanying drawings is a reproduction, taken from the last three of the above mentioned U.S. patents, showing that portion of the molding assembly where a valved injector H is installed.

As shown in FIG. 12, the mold assembly comprises an upper die F having a molding surface which defines an outer surface of the eventually formed door panel, and a lower die G having a molding surface which defines an inner surface of the same door panel. When the upper and lower dies F and G are closed together, a molding cavity is formed between the molding surfaces of these dies, in which cavity is formed a molded product E. Subsequent to the compression molding of the molded product E, the upper die F is separated, while the mold assembly is still maintained in a sealed condition, to form a coating space between the molding surface of the upper die F and the molded product E. Thereafter, a controlled quantity of coating material is injected by the injector H into the coating space, followed by the movement of the upper die F close towards the lower die G to spread the injected coating material over the entire surface of the molded product E. The coating material so applied over the molded product E is subsequently cured to form a coating layer.

According to the in-mold coating technique, even though the molded product E has blow holes formed on one surface thereof confronting the coating space, the coating material so injected can enter and fill up such blow holes and, therefore, the aesthetically beautiful skin can be formed on the molded and coated product.

However, the in-mold coating technique utilizing the mold assembly such as shown in FIG. 12 has drawback in that, since the coating material is injected onto one surface of the molded product E in a direction confronting the molded product E, an outer surface of the resultant coating layer opposite the molded product E tends to have a marking left by a shut-off pin I which forms a valve member of the injector H, with the consequence that the aesthetic value of the molded and coated product is lowered.

Figure 13:
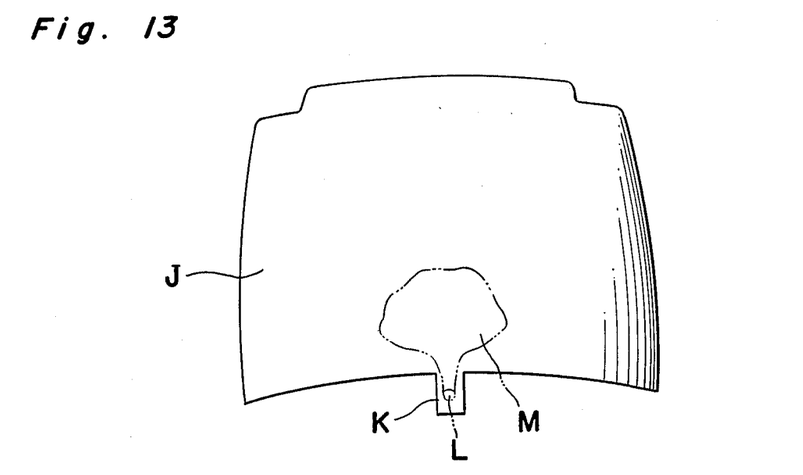
FIG. 13 is a schematic top plan view illustrating the manner in which a coating material is injected.

The above described problem inherent in the prior art in-mold coating technique may be obviated if the molded product J is provided with a runner K which would be removed at the final stage of make-up of the molded and coated product as shown in FIG. 13. If the molded product J is provided with the runner K and the shut-off pin L of the injector is so positioned as to align with this runner K, no marking left by the shut-off pin L is seen in the molded and coated product because the runner is removed. However, this contemplated method is problematic in that the coating material when injected and subsequently compressed can not always uniformly spread over the entire surface of the molded product, resulting in the formation of the coating layer of irregular thickness. The thickness of the coating layer at a location furthest from the position where the runner had been formed would be smaller than that at a location close to that position.

The increased number of the runners and the use of the correspondingly increased number of the injectors, one for each runner, would obviate the above described drawback, however, not only does the system as a whole become bulky; but also the increased manufacturing cost will be incurred.

SUMMARY OF THE INVENTION

The present invention has been developed with a view to substantially eliminating the above discussed problems inherent in the prior art in-mold coating techniques and has for its essential object to provide an improved method and an improved apparatus both effective to provide a molded and coated product wherein one surface of the coating layer opposite the molded product is free from any surface imperfections including any marking which would be left by the shut-off pin.

Another object of the present invention is to provide an improved method and an improved apparatus of the type referred to above, effective to provide the molded and coated product having the coated layer of uniform thickness substantially over the entire surface thereof.

In order to accomplish the above described objects of the present invention, the use is made of an in-mold coating apparatus which comprises first and second dies supported for movement relative to each other and having first and second molding surfaces defined therein, respectively, for defining a mold cavity when the first and second dies are closed together; a generally elongated perforating means supported by the first die for sliding movement between projected and completely retracted positions, said perforating means being operable for forming a perforation in the molded product when moved to the projected position and subsequent to the closure of the mold assembly; and an injector means positioned on one side of the first die remote from the second die for injecting a fluidized coating material through the perforation into a coating space defined between the molded product and the second molding surface of the second die when the second die is separated from the molded product while the mold assembly is still maintained in a sealed condition, said injector means being operable subsequent to the movement of the perforating means from the projected position towards the completely retracted position.

In a preferred embodiment of the present invention, the elongated perforating means is constituted by a shut-off pin forming a valve member for the injector means. The elongated perforating means, that is, the shut-off pin, can also serve as an alignment rod where the molded product has been formed with a perforation, that is, where one or more sheets of thermosetting plastics to be compression-molded have been formed with a respective perforation.

With the use of the above described apparatus, during the compression-molding of the thermosetting resin sheet or sheets to form the molded product, the perforating means is caused to project into the mold cavity through the first die and through the sheets then fluidized. When the perforating means is withdrawn inwardly of the first die, a perforation is left in the eventually formed molded product. Thereafter, the second die is separated from the molded product while still maintaining the mold assembly in a sealed condition to form a coating space between the molded product and the second die, into which coating space a fluidized coating material is injected through the perforation of the molded product. The first and second dies are subsequently brought close towards each other to spread the injected coating material over the molded product thereby to form the coating layer on the molded product facing the second die.

In order to ensure that the resultant coating layer can have a thickness uniform over the entire surface thereof, the injector is preferably so positioned as to align with a generally central portion of the ultimately formed coating layer or the final product having the coating layer.

BRIEF DESCRIPTION OF THE DRAWINGS

These and other objects and features of the present invention will become clear from the following detailed description taken in conjunction with preferred embodiments thereof with reference to the accompanying drawings, in which.

DETAILED DESCRIPTION OF THE EMBODIMENTS

Before the description of the present invention proceeds, it is to be noted that like parts are designated by like reference numerals throughout the accompanying drawings. It is also to be noted that, while both the method and the apparatus according to the present invention are applicable to the manufacture of any desired molded produced if the latter is of a type having a substrate and a coating on one surface of the substrate, reference will be herein made to the manufacture of an automobile hood for covering an engine compartment in an automobile body structure for the sake of brevity.

Figure 1:
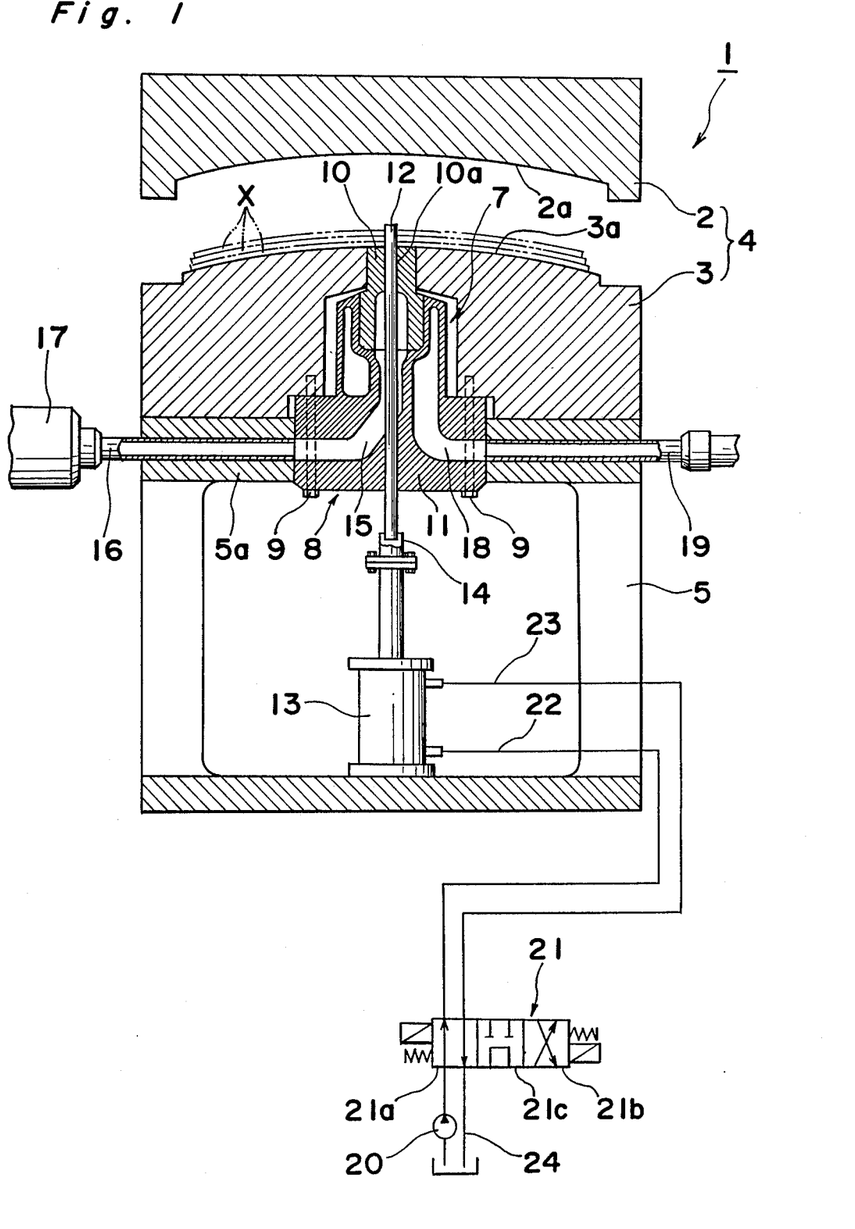
FIG. 1 is a schematic longitudinal sectional view of an in-mold coating apparatus according to a first embodiment of the present invention.

Referring to FIGS. 1 to 4 and, particularly, to FIG. 1, an in-mold coating apparatus generally identified by 1 comprises a split-type mold assembly 4 including upper and lower dies 2 and 3 supported for movement relative to each other in a direction close towards and away from each other. In the illustrated embodiment, the upper die 2 is supported by any suitable guide structure (not shown) for movement close towards and away from the lower die 3 which is fixedly mounted on a raiser strcture generally identified by 5. The upper and lower dies 2 and 3 have respective molding surfaces defined at 2a and 3a so as to confront each other, said molding surfaces 2a and 3a defining a mold cavity 6 (FIG. 2) therebetween when the upper and lower dies 2 and 3 are closed together in a manner as will be described later. Each of the upper and lower dies 2 and 3 can be heated in any known manner by a suitable heating system so that the respective molding surface 2a or 3a can attain a predetermined temperature, for example, 140° C.

The lower die 3 has a generally cylindrical recess 7 defined therein at a location immediately below a central area of the molding surface 3a, into which recess 7 is inserted an injector assembly 8 from below. The injector assembly 8 so inserted into the recess 7 is bolted at 9 and, therefore, rigidly secured to the lower die 3. This injector assembly comprises a generally elongated nozzle member 10 and a generally elongated injector body 11 having a flanged lower end rigidly secured to the lower die 3 by means of the bolts 9. The opposite upper end of the injector body 11 is situated inside the recess and has the nozzle member 10 inserted therein. One end of the nozzle member 10 remote from the injector body 11 is fluid-tightly received in a bearing hole having one end opening at the central area of the molding surface 3a and the other end communicated with the recess 7, said one end of the nozzle member 10 having an annular end face which is flush with, and forms a part of, the molding surface 3a.

Figure 2:
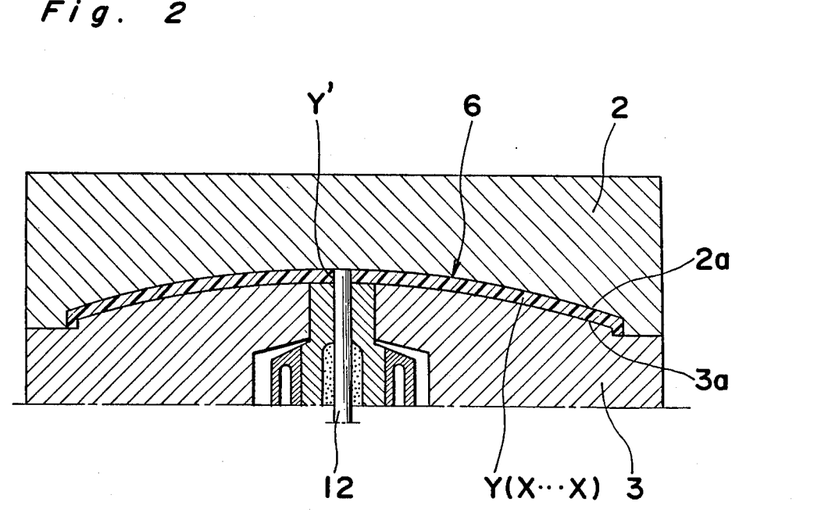
FIG. 2 to FIG. 4 are schematic longitudinal sectional views, respectively, on an enlarged scale, of a portion of the apparatus showing the sequence of in-mold coating carried out by the apparatus.
Figure 3:
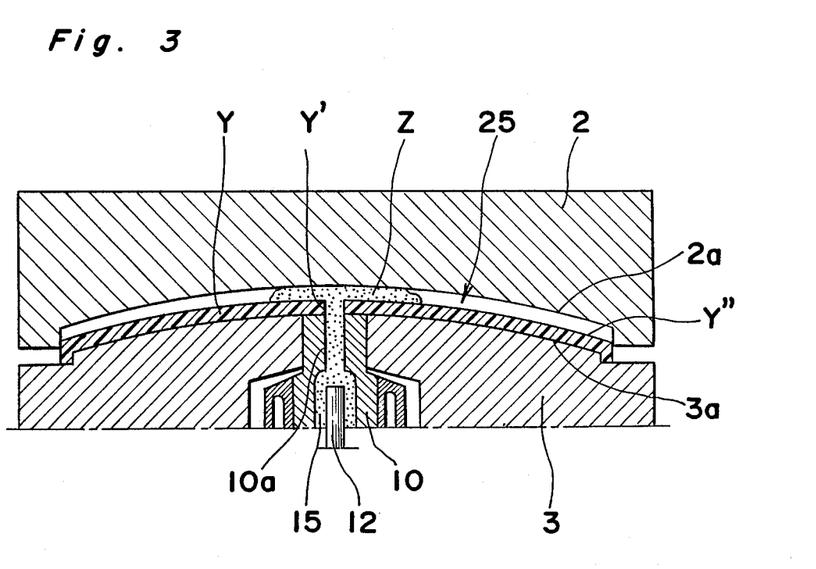

The nozzle member 10 has a sprue 10a defined therein in alignment with the longitudinal sense of the injector assembly 8 so as to extend completely through the length thereof, and has a shut-off pin 12 slidably received in the sprue 10a. This shut-off pin 12 also extends slidably through the injector body 11 and is drivingly coupled with a piston rod of a double-acting hydraulic cylinder 13 stationarily disposed in the raiser structure 5. By the reason which will become clear from the subsequent description, an elastic member 14, which may be either an elastic pad or a coiled spring, or both, is interposed between the shut-off pin 12 and the piston rod of the hydraulic cylinder 13. By the action of the hydraulic cylinder 13, the shut-off pin 12 is movable between a projected position, in which, as best shown in FIGS. 1 and 2, the free end of the shut-off pin 12 remote from the piston rod 12 projects a predetermined projecting distance outwardly from the nozzle member 10 and into the mold cavity 6, and a completely retracted position in which the free end of the shut-off pin 12 is clear from the sprue 10a as shown in FIG. 3 for the purpose which will become clear from the subsequent description.

The injector body 11 has a resin passage 15 defined therein. The resin passage 15 has one end fluid-connected with a discharge port of a mixer 17 through a supply conduit 16 extending or embedded in an upper frame portion 5a of the raiser structure 5, and the other end adapted to be communicated with the sprue 10a in the nozzle member 10 when and so long as the shut-off pin 12 is moved to the completely retracted position. This injector body 11 also has a coolant jacket 18 defined therein so as to surround the resin passage 15, to which jacket 18 is connected coolant inflow and outflow conduits, only one of the conduits being shown by 19 as extending in the upper frame portion 5a of the raiser structure 5.

Material to be coated on a surface of a molded sheet Y (FIGS. 2 to 4), which is hereinafter referred to as a coating material, is, in the illustrated instance, used in the form of a two-component thermosetting resin system comprised of two components, a matrix and a curing agent. Therefore, prior to the resin system being supplied into the resin passage 15, the mixer 17 serves to uniformly mix the two components together and then inject it into the resin passage 15 through the conduit 16. Coolant, for example, water, circulated through the coolant jacket 18 serves to keep the temperature of the resin system in the passage 15 low enough to avoid any possible premature curing of the resin system which would occur under the influence of heat evolved from the lower die 3. An example of the coating material may be a two-component urethane resin system comprised of, for example, polyol as the matrix and isocyanate as the curing agent.

The hydraulic cylinder 13 for driving the shut-off pin 12 is of a double acting type having lower and upper working chambers divided by a piston rigid with the piston rod, said lower and upper working chambers being fluid-connected with a fluid source, including a fluid reservoir and a fluid supply pump 20, through an electromagnetically operated switching valve 21. The switching valve 21 can take three operative positions at a time. These operative positions include a lifting position 21a at which a first fluid line 22 leading from the lower working chamber of the hydraulic cylinder 13 is communicated with the fluid supply pump 20 and a second fluid line 23 leading from the upper working chamber of the same hydraulic cylinder 13 is communicated with a drain piping 24 as shown in FIG. 1; a lowering position 21b at which the first and second fluid lines 22 and 23 are disconnected from the fluid source while allowing the fluid supply pump 20 to be directly communicated with the drain piping 24.

Figure 4:
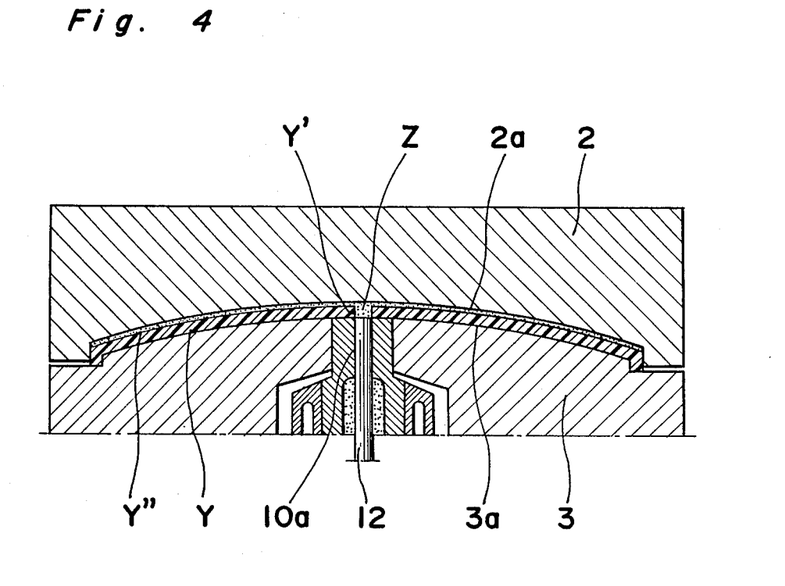

This switching valve 21 is operable in response to a signal, generated from a position detector (not shown) for detecting the position of the shut-off pin 12, to assume one of the lifting, lowering and hold positions. By this switching operation of the switching valve 21, the shut-off pin 12 can be vertically moved between the projected position, shown in FIGS. 1 and 2, and the completely retracted position, shown in FIGS. 3, through a level position shown in FIG. 4 and located generally intermediate between the projected and completely retracted positions. More specifically, when the switching valve 21 is in the lifting position 21a as shown in FIG. 1, the shut-off pin 12 is driven upwardly to the projected position at which, as hereinbefore described, the free end of the shut-off pin 12 projects the predetermined projecting distance outwardly and upwardly from the molding surface 3a while closing the sprue 10a. At the lowering position 21b of the switching valve 21, the shut-off pin 12 is driven downwardly to the completely retracted position at which the free end of the shut-off pin 12 is retracted inwardly of the injector assembly clearing from the sprue 10a which then communicates the resin passage 15 with the mold cavity 6 as shown in FIG. 3. However, when the switching valve 21 is in the hold position 21c, the shut-off pin 12 is held at the level position generally intermediate between the projected and completely retracted positions, at which the free end face of the shut-off pin 12 is flush with the annular free end face of the nozzle member 10 and, hence, the molding surface 3a while forming a part of the molding surface 3a and, at the same time, closing the sprue 10a as best shown in FIG. 4.

Hereinafter, the operation of the in-mold coating apparatus of the construction described above will be described with particular reference to FIGS. 2 to 4. It is to be noted that the in-mold coating apparatus 1 according to the present invention can be used, as is the case with the prior art in-mold coating apparatus, to perform a dual function of making a molded product, followed by the coating of a coating or skin-forming material on one surface of the molded product to complete the final product.

While the upper die 2 is separated a large distance away from the lower die 3 and, at the same time, the shut-off pin 12 is held in the projected position as shown in FIG. 1, one or more, for example, three, sheets of SMC (sheet molding compound) generally identified by X are placed on the molding surface 3a of the lower die 3. By way of example, each SMC sheet may be of a composition including a matrix mixture of 80 wt % of unsaturated polyester resin as a matrix with 20 wt % of saturated polyester resin as a low-shrink additive; 0.1 parts by weight of TBP (tertiary-butyl perbenzoate) as a cure-accelerating catalyst; 0.1 parts by weight of PBQ (perbenzoquinone) as a stabilizer; 180 parts by weight of calcium carbonate as a filler; 1 part by weight of magnesium oxide as a thickening agent; 5 parts by weight of styrene as a crosslinking agent; and 28 parts by weight of glass fibers as a reinforcing material, wherein the part by weight is based on the weight of 100 parts by weight of the matrix mixture.

After the placement of the SMC sheets X on the molding surface 3a of the lower die 3, the upper die 2 is driven downwardly towards the lower die 3 so as to form the mold cavity 6 between the molding surfaces 2a and 3a while the SMC sheets X are compressed together, as shown in FIG. 2. Since at this time the molding surfaces 2a and 3a are heated to the predetermined temperature, for example, 140° C., the SMC sheets X having been compressed together are melted to spread over the mold cavity 6 while being progressively cured by the action of the catalyst contained in the SMC sheets X, finally forming a molded product Y having a thickness of, for example, 3 mm, as shown in FIG. 2.

It is to be noted that the compression of the SMC sheets X carried out subsequent to the placement of the SMC sheets X on the molding surface 3a while the shut-off pin 12 has been held in the projected position, that is, while the free end of the shut-off pin 12 has projected the predetermined distance outwardly from the molding surface 3a, results in the formation of an opening Y' in the molded project Y in alignment and in complemental relationship with the free end of the shut-off pin 12. The predetermined projecting distance over which the free end of the shut-off pin 12 projects outwardly from the molding surface 3a when the shut-off pin 12 is in the projected position is selected so as to be slightly greater than the spacing of the mold cavity 6 defined between the molding surfaces 2a and 3a when the upper and lower dies 2 and 3 are closed together, and on the other hand, the elastic member 14 interposed between the shut-off pin 12 and the piston rod of the hydraulic cylinder 13 is so designed as to be compressed inwardly a distance equal to the difference between the predetermined projecting distance and the spacing of the mold cavity 6, at the time the upper and lower dies 2 and 3 are closed together. The selection of the particular projecting distance for the shut-off pin 12 and the use of the elastic member 14 altogether are effective to avoid the possibility that some reinforcing fibers contained in the molded product Y may be so bitten between the free end face of the shut-off pin 12 and the molding surface 2a, when the upper and lower dies 2 and 3 are closed to compress the SMC sheets X together, as to leave interstices into which a melt of the SMC sheets may enter to form a resin film. In other words, the use of the elastic member 14 in combination with the particular projecting distance for the shut-off pin 12 has been made to ensure that, upon compression of the SMC sheets X, the opening Y' extending completely through the thickness of the molded product Y can be formed in the molded product Y as a marking of the free end of the shut-off pin 12.

After the formation of the molded product Y within the mold cavity 6, the upper die 2 is moved a predetermined distance upwardly and away from the lower die 3 so that a coating space 25 can be formed between the molding surface 2a and an upper surface Y'' of the molded product Y held in contact with the molding surface 3a as shown in FIG. 3, this predetermined distance being so selected that the coating space 25 may have a thickness of, for example, 3 mm as measured between the molding surface 2a and the upper surface Y'' of the molded product Y.

Substantially simultaneously with or immediately after the formation of the coating space 25 above the molded product Y, by the switching of the switching valve 21 and the incident operation of the hydraulic cylinder 13, the shut-off pin 12 is moved from the projected position at a stroke to the completely retracted position to establish a fluid communication between the passage 15 and the coating space 25 through the sprue 10a and the opening Y' in the molded product Y. Upon the communication established between the passage 15 and the coating space 25, a reserve of coating material Z supplied under pressure from the mixer 17 into the passage 15 through the conduit 16 is allowed to flow into the coating space 25 through the sprue 10a and then through the opening Y' in the molded product Y as shown in FIG. 3. After a predetermined amount of the coating material has been injected into the coating space 25, the upper die 2 is again moved towards the lower die 3 a predetermined distance enough to permit material Z within the coating space 25 to spread over the entire surface Y'' of the molded product Y thereby to form a coating layer of predetermined thickness as shown in FIG. 4. It is to be noted that no sooner than the predetermined amount of the coating material is injected into the coating sprue 25, the shut-off pin 12 in the completely retracted position is moved to the level position. Therefore, even though the upper die 2 is lowered to compress the coating material, the coating material once injected into the coating space 25 does not substantially flow back towards the passage 15. It is also to be noted that the opening Y' in the molded product Y is filled up with the coating material Z as shown in FIG. 4.

Figure 5:
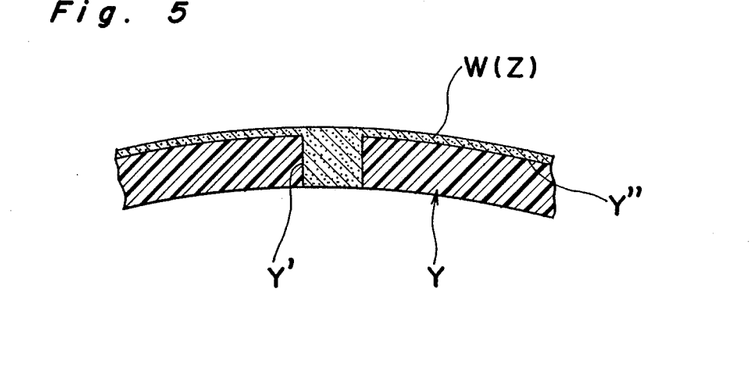
FIG. 5 is a longitudinal sectional view, on an enlarged scale, of a portion of an in-mold coated molding made by the use of the apparatus.

The coating material Z so spread over the molded product Y is subsequently cured by heat transmitted from the upper and lower dies 2 and 3, and after the complete curing, the upper and lower dies 2 and 3 are opened for the removable of the final product from the mold assembly 4. As best shown, the final product exhibits such a sectional representation that the coating layer of uniform thickness, for example, 100 $\mu$m, identified by W is firmly interlocked with one surface of the molded product Y with the opening Y' completely closed by the hardened coating material. The coating material filling up the opening Y' facilitates the firm interlocking between the molded product Y and the coating layer W because it is in practice anchored in the opening Y'. Preferably, the thickness of the coating layer W on the final product may be within the range of 80 to 120 $\mu$m.

The presence of the opening Y' in the final product would not pose any practical problem as to the physical strength of the final product because the coating material when cured exhibits a required strength while firmly interlocking with the molded product Y.

Thus, from the foregoing description, it is clear that the present invention is effective to provide the final product wherein an exterior surface of the coating layer remote from the molded product is free from aesthetically undesirable flaws, particularly a marking left by the sprue or runner.

In the foregoing description, the opening Y' has been shown and described as formed by the free end of the shut-off pin 12 as the upper and lower dies 2 and 3 are closed together subsequent to the placement of the SMC sheets X on the molding surface 3a. However, in the practice of the present invention, each of the SMC sheets X may have a pre-formed perforation, i.e., a perforation formed prior to the placement of the SMC sheets X into the mold assembly 4 for registration with the shut-off pin 12, so that when the SMC sheets X are placed on the molding surface 3a, the shut-off pin 12 in the projected position can be allowed to pass through the respective perforations in the SMC sheets X.

Furthermore, the foregoing description has made it clear that the upper die 2 movable relative to the lower die 3 has an opened position, at which the upper die 2 is separated away from the lower die sufficiently for the placement of the SMC sheets on the molding surface 3a or the removal of the final product therefrom, and first and second closed positions at which the upper and lower dies 2 and 3 are closed together, wherein the first closed position is such that the mold cavity 6 for the compression molding of the molded product Y is defined and the second closed position is such that the coating space 25 is defined between the upper and lower dies 2 and 3 and immediately above the molded product Y. A drive system for moving the upper die 2 relative to the lower die 2 although not positively discussed and shown may be of any known design.

FIGS. 6 to 10 illustrate another preferred embodiment of the in-mold coating apparatus wherein one or more, for example, two, knock-out pins are utilized, as generally identified by 31, for forcibly separating the final product from the molding surface 3a after the upper die 2 has been returned to the opened position.

Figure 6:
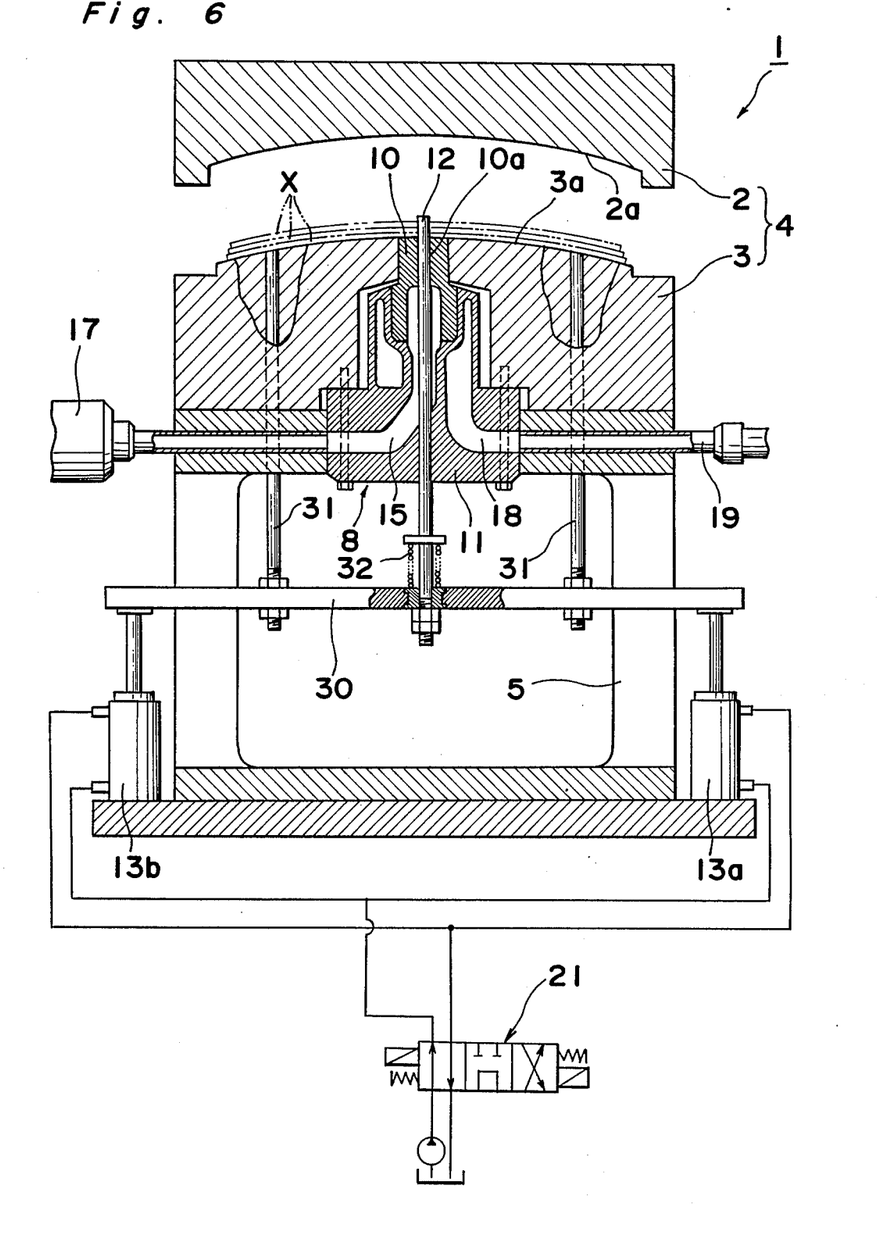
FIG. 6 is a view similar to FIG. 1, showing the apparatus according to another embodiment of the present invention.

Referring first to FIG. 6, the knock-out pins 31 are designed so as to be movable together with the shut-off pin 12. For this purpose, instead of the use of the only hydraulic cylinder 13 in the foregoing embodiment, two hydraulic cylinders 13a and 13b are used, having their upper and lower working chambers fluid-connected with the fluid source through the switching valve 21 so that both of the hydraulic cylinders 13a and 13b can be operated simultaneously in the same sense. A bridge plate 30 has its opposite ends rigidly mounted on respective piston rods of the hydraulic cylinders 13a and 13b so as to extend below the lower die 3 in a direction perpendicular to the longitudinal axis of the shut-off pin 12. The shut-off pin 12 is mounted on the bridge plate 30 through a coil spring 32 which functions in a manner substantially identical with the elastic member 14 used in the foregoing embodiment.

Figure 7:
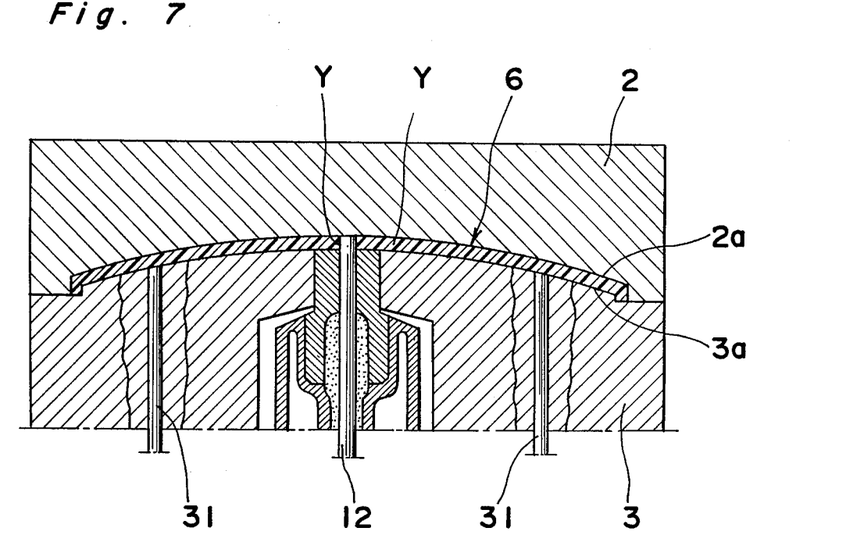
FIG. 7 to FIG. 10 are views similar to FIGS. 2 to 4, showing the sequence of in-mold coating carried out by the apparatus of FIG. 6.

The knock-out pins 31 slidably extend through respective guide holes defined in the lower die 3 in spaced relation to each other and are rigidly connected at one end with the bridge plate 30 for movement together therewith. The length of each of the knock-out pins 31 is so selected that, when and so long as the shut-off pin 12 is held in the projected position with its free end projecting the predetermined projecting distance outwardly from the molding surface 3a, the free end face of the respective knock-out pin 31 can be held flush with the molding surface 3a while forming a respective part of the molding surface 3a as shown in FIGS. 6 and 7.

Figure 8:
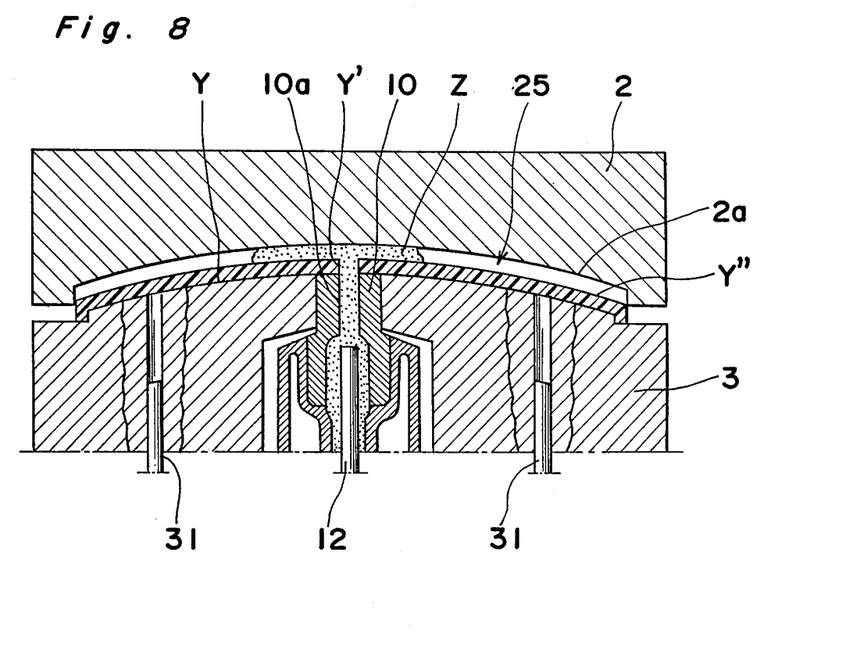
Figure 9:
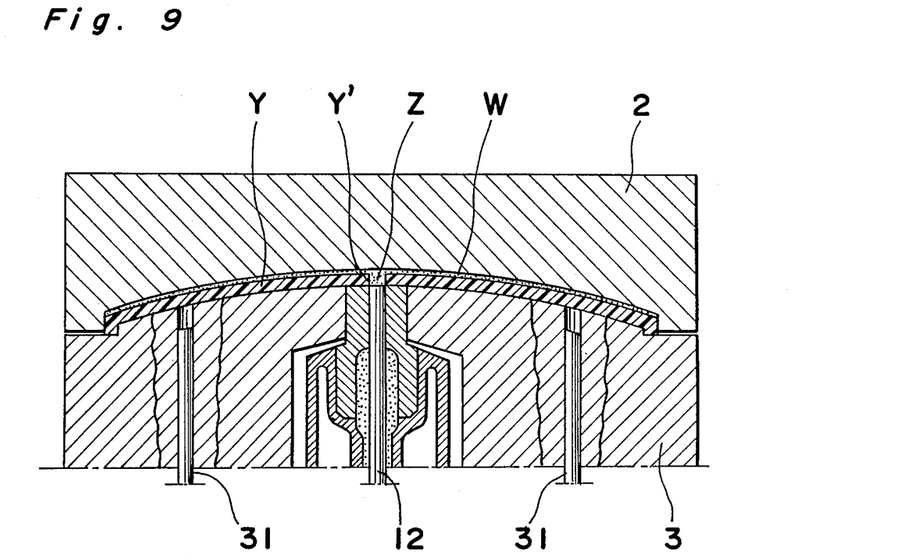

The apparatus shown in and described with reference to FIG. 6 operates in substantially the same manner as that according to the embodiment of FIG. 1 and so is made clear from the comparison of FIGS. 7 to 9 with FIGS. 2 to 4. Only the difference in operation lies in that, with the apparatus according to the embodiment of FIG. 6, subsequent to the opening of the mold assembly 4 upon the completion of the curing of the coating layer W on the molded product Y, and when the shut-off pin 12 is moved towards a position upwardly beyond the projected position, the knock-out pins 31 are raised to forcibly separate the final product away from the molding surface 3a of the lower die 3 as shown in FIG. 10.

Figure 10:
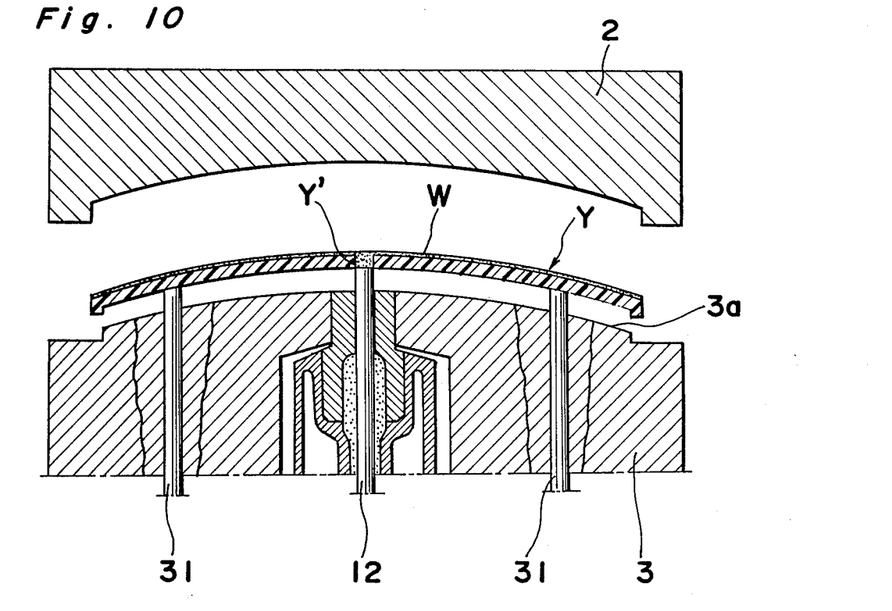

It is to be noted that the coil spring 32 used in the embodiment of FIGS. 6 to 10 is of a type which can be axially inwardly compressed by the weight of the final product and, therefore, when the knock-out pins 31 have been raised as shown in FIG. 10, the shut-off pin 12 can be downwardly displaced against the spring 32, permitting the final product to rest on all of the pins 12 and 31 as shown in FIG. 10.

Although the present invention has been fully described in connection with the preferred embodiments thereof with reference to the accompanying drawings, it is to be noted that various changes and modifications are apparent to those skilled in the art. By way of example, although reference has been made to the two-component type resin system as a coating material, a one-component type, for example, a urethane system comprising polyol and blocked isocyanate may be employed as the coating material.

Also, in the embodiment shown in and described with reference to FIGS. 6 to 10, separate cylinder units and their associated fluid circuits may be used for driving the shut-off pin and the knock-out pins.

Accordingly, such changes and modifications are to be understood as included within the scope of the present invention as defined by the appended claims, unless they depart therefrom.

We claim:

1. A method for forming a coating layer on a molded product formed in a split-type mold assembly, which assembly comprises first and second dies supported for movement relative to each other, and an injector means for injecting a fluidized coating material, said injector means including a valving rod slidably extending through a supply passage means, defined in the first die, for movement between projected and retracted positions, said injector means being positioned on one side of the first die remote from the second die, said valving rod having first and second ends opposite each other, the first end of said valving rod being coupled with a drive source and the second end of said valving rod confronting the second die through the passage means, said second end of the valving rod being, when the valving rod is moved inwardly of the first die to the retracted position, clear of the passage means to permit the latter to be opened, said valving rod adapted to close the passage means after the valving rod has been moved a predetermined distance from the retracted position toward the projected position, which method comprises the steps of:

moving the valving rod to the projected position with the second end of said valving rod piercing through the molded product to form a perforation in said molded product during the formation of the molded product within a molding cavity defined between the first and second dies, said molded product having first and second surfaces opposite each other, the first surface of said molded product resting on the first die;

separating the second die from the second surface of the molded product to provide a coating space between the second die and the second surface of the molded product;

moving the valving rod to the retracted position with the second end of the valving rod clear of the passage means to permit the passage means to communicate with the coating space through the perforation in the molded product;

injecting the coating material into the coating space through the passage means and then through the perforation in the molded product;

moving the valving rod in the retracted position toward the projected position to close the passage means; and moving one of the first and second dies close to the other of the first and second dies to form the coating layer on the second surface of the molded product.

2. The method as claimed in claim 1, including moving the valving rod to a position spaced a distance inwardly from the projected position and at which the second end is substantially flush with a surface of the first molding die on which the molded product rests during the moving of the valving rod towards the projected position to close the passage means.

3. A method of forming a coating layer on a molded product formed in a split-type mold assembly, which assembly comprises first and second dies supported for movement relative to each other, and an injector means for injecting fluidized coating material, said injector means including a valving rod slidably extending through a supply passage means, defined in the first die, for movement between projected and retracted positions, said injector means being positioned on one side of the first die remote from the second die, said valving rod having first and second ends opposite each other, the first end of said valving rod being coupled with a drive source and the second end of said valving rod confronting the second die through the passage means, said second end of the valving rod being, when the valving rod is moved inwardly of the first die to the retracted position, clear from the passage means to permit the latter to be opened, said valving rod adapted to close the passage means after the valving rod has been moved a predetermined distance from the retracted position toward the projected position, which method comprises the steps of:

placing a sheet of fiber reinforced thermosetting resin, having a perforation defined therein, on the first die with the second end of the valving rod aligned with and extending through the perforation while the valving rod is held in the projected position;

moving one of the first and second dies close to the other of the first and second dies to close the mold assembly to heatpress the sheet to complete the molded product having first and second surfaces opposite each other;

separating the second die from the second surface of the molded product to provide a coating space between the second die and the second surface of the molded product;

moving the valving rod to the retracted position with the second end of the valving rod clear of the passage means to permit the passage means to communicate with the coating space through the perforation in the molded product, while leaving the perforation in the molded product;

injecting the coating material into the coating space through the passage means and then through the perforation in the molded product;

moving the valving rod in the retracted position toward the projected position to close the passage means; and moving one of the first and second dies close to the other of the first and second dies to form the coating layer on the second surface of the molded product.

4. The method as claimed in claim 3, wherein during the moving of the valving rod toward the projected position to close the passage means, the valving rod is moved to a position spaced a distance inwardly from the projected position and at which the second end thereof is substantially flush with a surface of the first molding die on which the molded product rests, whereby the perforation in the molded product is filled with the coating material.

5. The method as claimed in claim 2, wherein the moving of the valving rod to the retracted position permitting communication with the coating space through the performation in the molded product is subsequent to complete curing of the molded product.

6. The method as claimed in claim 2, further comprising the step of moving the valving rod to the projected position subsequently to the moving of said one of the first and second dies close to the other of the first and second dies for forcibly separating the molded product, having the coating layer thereon, from the first die for the removal of a final product from the mold assembly.

7. The method as claimed in claim 4, further comprising the step of moving the valving rod to the projected position subsequently to the moving of said one of the first and second dies close to the other of the first and second dies, for forcibly separating the molded product, having the coating layer thereon, from the first die for the removal of a final product from the molded assembly.

* * * * *